No. 766,823. Patented August 9, 1904.

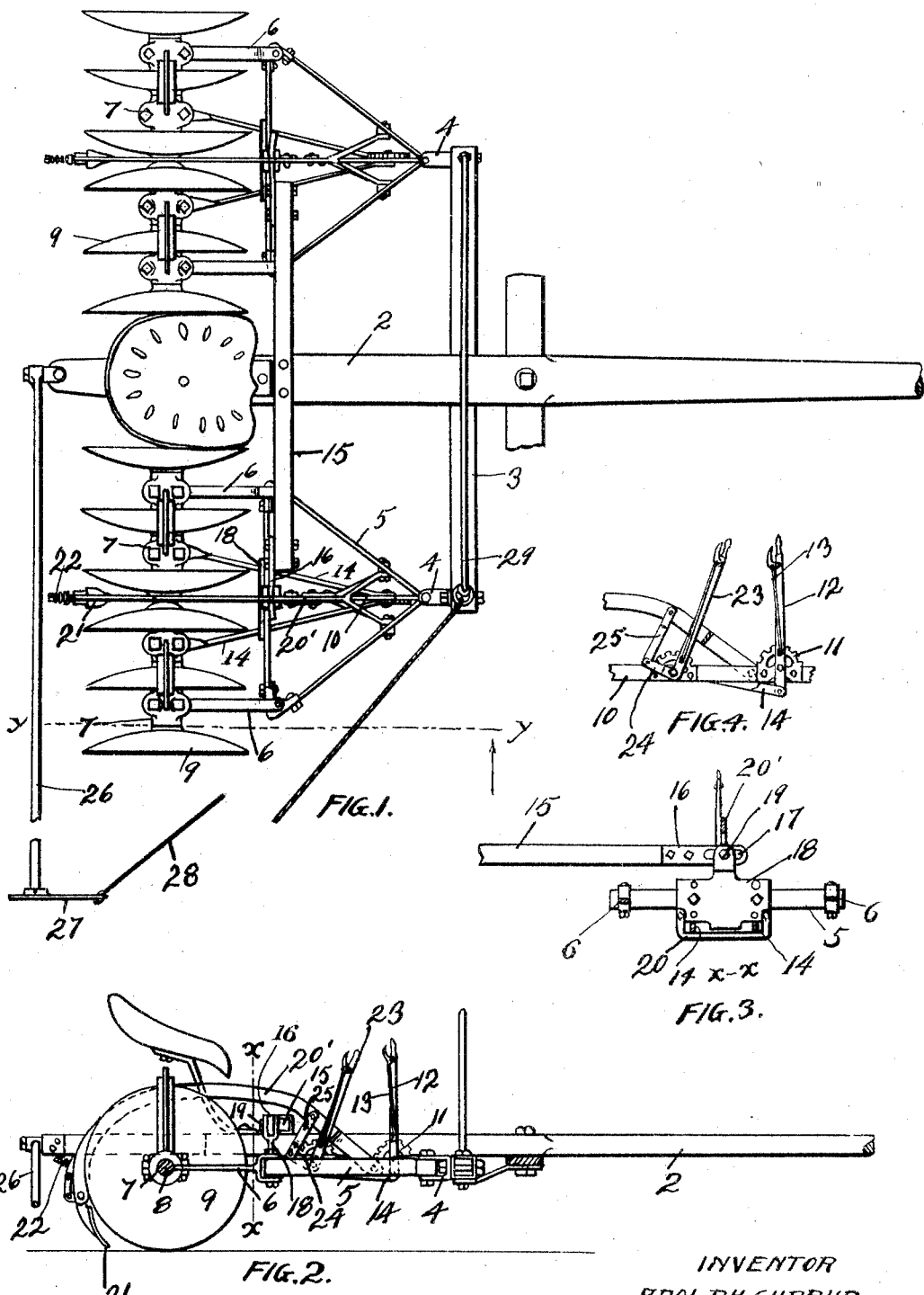

UNITED STATES PATENT OFFICE.

ADOLPH GUBRUD, OF HUDSON, SOUTH DAKOTA.

MACHINE FOR PREPARING AND RIDGING CORN GROUND.

SPECIFICATION forming part of Letters Patent No. 766,823, dated August 9, 1904.

Application filed September 15, 1903. Serial No. 173,233. (No model.)

*To all whom it may concern:*

Be it known that I, ADOLPH GUBRUD, of Hudson, county of Lincoln, State of South Dakota, have invented certain new and useful Improvements in Machines for Preparing and Ridging Corn Ground, of which the following is a specification.

My invention relates to agricultural implements; and the object of the invention is to provide a machine for making furrows in the soil preparatory to planting corn therein and one that is equally well adapted for use on rough and weedy as well as smooth ground.

A further object is to provide a machine which will cover the grass and prevent it from getting ahead of and choking the corn.

A further object is to provide a machine which will form furrows in the soil wherein the corn will become deeply rooted and be out of the way of the corn-plow shovel. Other objects of the invention will appear from the following detailed description.

The invention consists generally in various constructions and combinations, all as hereinafter described, and particularly pointed out in the claims.

In the accompanying drawings, forming part of this specification, Figure 1 is a plan view of a machine embodying my invention. Fig. 2 is a section of the same on the line $y\,y$ of Fig. 1. Fig. 3 is a section on the line $x\,x$ of Fig. 2. Fig. 4 is a detail of the lever mechanisms and their connections.

In the drawings, 2 represents a draft-pole and 3 a cross-bar provided thereon. In the rear of this cross-bar upon each side of the pole I provide a series or gang of pulverizing-disks, those upon one side of the pole being duplicates of those on the other side, and consequently a description of one set will be sufficient.

4 is a clip secured to the cross-bar 3 near its end and pivotally connected to the apex of a preferably triangular frame 5, that is provided at its rear corners with pivotally-mounted draft-links 6, that connect the said frame with bearings 7 of independently-arranged shafts 8, whereon a series of pulverizing-disks 9 are mounted. I prefer to provide two gangs of three disks each upon each side of the machine, the disks of each gang being oppositely arranged from the disks of the other gang on the same side of the machine, and all these disks are adapted to form furrows in the soil, wherein the corn is subsequently planted by checking or drilling. A brace-bar 10 is provided on the frame 5, extending from the forward end thereof to the rear side and having a quadrant 11 and a pivotally-supported lever 12, having a latch 13 to engage the teeth of said quadrant, and said lever is pivotally connected at its lower end to bars 14, that are attached to the shafts 8 and are adapted to oscillate the same either forward or back, according to the direction in which the lever 12 is moved. If said lever is thrown forward, the bars 14 will be thrust backward, swinging the inner contiguous ends of the shafts 8 toward the back of the machine and causing the disks to operate at an angle in the soil. This is for the purpose of cutting up and pulverizing lumps of dirt or grass and roots, and it will at the same time form the ground into suitable furrows and ridges of different sizes, according to the adjustment of the machine. I prefer to provide a cross-bar 15 on the pole 2 in the rear of the bar 3 and arrange thereon a bar 16, having a curved outer end provided with a slot 17. A plate 18 is connected with the slot 17 by a pin 19, that is slidable therein to allow the frame 5 to automatically adjust itself to the different positions of the disks, the plate 18 being bent to conform substantially to the arc on which the said frame swings. A strap 20 is secured to the plate 18, and between this strap and said plate the bars 14 are passed.

The inner disks of each gang on the same side of the machine are oppositely arranged, as shown, and in operation a small ridge will be formed in the soil between them. To remove this ridge and at the same time loosen the ground for the corn-planter runners, I prefer to provide an arm 20', pivoted on the frame 5 at its forward end and extending back between the central disks of each series and having a shovel at its rear end that is yieldingly held in an operative position by means of a spring 22. A quadrant similar to the one heretofore described is provided on the bar 10, and a lever 23, having a right-angled extension 24, is pivoted on the bar 10 and has a latch adapted to engage the teeth of said quadrant, and said right-angled extension is connected by a link 25 with the arm 20′. The operation of this lever will serve to raise and lower the said arm and elevate or depress the shovel 21. A rod 26 is connected with the rear end of the pole 2 and carries a marker 27, from which a rope 28 leads to a rod 29 upon the cross-bar 3. The rod 26 and the marker may be swung from one side of the machine to the other, according to the direction the machine is moving with respect to the uncultivated portion of the field.

The operation of the machine is as follows: The disks having been set at the desired angle by the manipulation of the lever 12, the operator will start the machine, and the disks will form furrows in the soil, wherein the corn is subsequently planted. The pulverizing and grass-cutting effect can be readily obtained by altering the position of the disks and their shafts with respect to the direction of movement of the machine. As the machine moves along the frames 5 will swing on their pivots, moving laterally on the cross-bar 15, so as to provide a uniform draft on the disk and an equal strain upon the frames.

With a machine of this kind the ground can be quickly and thoroughly prepared for planting corn. The furrows wherein the corn is planted will be of sufficient depth to allow the roots to reach the moist soil and be out of the way of the corn-plow shovel. The disks in forming the furrows will cut up the grass and bury the weeds that would otherwise quickly grow up and choke the corn. In plowing corn that has been planted in furrows made by my improved machine the plow-shovel will throw the dirt over into the furrows, filling up the same, so that after the corn plowing or cultivating has been completed the field will present a uniform smooth surface and will be in better condition for the next year's crop.

I claim as my invention—

1. The combination, with a draft-pole and a cross-bar secured thereon, of frames pivotally connected with said bar, shafts arranged in pairs upon each side of said pole in the rear of said frames, draft-links pivotally connecting said shafts with said frames, disks arranged in gangs upon said shafts, those upon one shaft being independently supported and oppositely arranged from those on the other shaft on the same side of the machine, and means for swinging said shafts forward and back to change the angle of said disks with respect to the line of movement.

2. The combination, with a draft means, of frames pivotally connected therewith, shafts arranged in pairs upon each side of the machine in the rear of said frames, disks mounted in gangs upon said shafts, those of one gang being oppositely arranged from those on the other, on the same side of the machine, links pivotally connecting said frames with said shafts, a lever, and bars connecting said lever with said shafts for swinging the same forward or back when said lever is operated.

3. The combination, with a draft-pole and cross-bar, of a frame pivotally connected with said bar, a second cross-bar, a sliding connection provided between said frame and said second bar, shafts in the rear of said second bar, disks mounted thereon, links pivotally connecting said frame and said shafts, and means for swinging said shafts forward and back, for the purpose specified.

4. In a machine of the class described, the combination, with a cross-bar and a slotted plate thereon, of a pivoted frame having a sliding connection with said slot, and a series of disks having a pivotal connection with said frame, substantially as described.

5. The combination, with a draft-pole and cross-bar, of shafts arranged in pairs end to end upon each side of said pole in the rear of said bar, suitable pivotal connections provided between said shafts and said bar, disks arranged in gangs upon said shafts, those upon one shaft being independently supported and oppositely arranged from those upon the other shaft on the same side of the machine, and means for swinging said shafts forward and back to change the angle of said disks with respect to the line of movement.

6. The combination, with a draft means, of frames pivotally connected therewith, shafts arranged in pairs upon each side of the machine in the rear of said frames, disks mounted in gangs upon said shafts, those of one gang being oppositely arranged from those of the other on the same side of the machine, means pivotally connecting said frames with said shafts, means for swinging said shafts forward and back to change the angle of said disks with respect to the line of movement, and a shovel device interposed between the contiguous disks of the adjacent gangs.

7. The combination, with a draft means, of a triangular frame pivotally connected thereto, shafts provided in the rear of said frame, disks mounted upon said shafts, those upon one shaft being oppositely arranged from those on the other shaft, means pivotally connecting said shafts with the rear of said frame, and a mechanism for swinging said shafts forward and back to vary the angle of said disks with respect to the line of movement.

8. The combination, with the draft-pole and cross-bars thereon, of frames pivotally connected to one of said bars and having a sliding connection with the other, disks arranged in gangs in the rear of said frames, and means for swinging said disks forward and back to change their angle with respect to the line of movement.

In witness whereof I have hereunto set my hand this 9th day of September, 1903.

ADOLPH GUBRUD.

In presence of—
C. H. CASSILL,
MARTIN OVERSETH.